United States Patent
Kjær

(10) Patent No.: US 8,394,886 B2
(45) Date of Patent: Mar. 12, 2013

(54) ALIPHATIC UNSATURATED POLYESTER RESINS PROVIDING EXCELLENT WEATHERING RESISTANCE

(75) Inventor: Peter Kjær, Birkerod (DK)

(73) Assignee: NEW-COAT A/S, Lynge (DK)

( * ) Notice: Subject to any disclaimer, the term of this patent is extended or adjusted under 35 U.S.C. 154(b) by 142 days.

(21) Appl. No.: 12/919,903

(22) PCT Filed: Feb. 16, 2009

(86) PCT No.: PCT/IB2009/000264
§ 371 (c)(1),
(2), (4) Date: Oct. 25, 2010

(87) PCT Pub. No.: WO2009/106944
PCT Pub. Date: Sep. 3, 2009

(65) Prior Publication Data
US 2011/0034617 A1    Feb. 10, 2011

(30) Foreign Application Priority Data

Feb. 29, 2008  (DK) .................................. 2008 00313

(51) Int. Cl.
*C08L 75/04*    (2006.01)
*C08L 31/04*    (2006.01)
*C08L 33/04*    (2006.01)

(52) U.S. Cl. ......... 524/507; 524/523; 524/524; 524/556

(58) Field of Classification Search ................... 524/507, 524/523, 524, 556
See application file for complete search history.

(56) References Cited

U.S. PATENT DOCUMENTS

| | | | |
|---|---|---|---|
| 3,655,820 A | 4/1972 | Kaupp | |
| 4,879,365 A | 11/1989 | Petschke et al. | |
| 5,464,909 A | 11/1995 | Chang et al. | |
| 5,741,448 A | 4/1998 | Wiseman | |
| 6,583,218 B1 | 6/2003 | Airola et al. | |
| 6,617,395 B1 | 9/2003 | Zhao et al. | |
| 6,617,417 B1* | 9/2003 | Airola et al. | 528/272 |
| 7,078,476 B2 | 7/2006 | Woong et al. | |

FOREIGN PATENT DOCUMENTS

| | | |
|---|---|---|
| DE | 101 27 290 | 12/2002 |
| EP | 0 787 769 | 8/1997 |
| EP | 1 203 783 | 5/2002 |
| GB | 1 399 304 | 7/1975 |

OTHER PUBLICATIONS

International Search Report for PCT/IB2009/000264.
Written Opinion of the International Searching Authority for PCT/IB2009/000264.
International Preliminary Report on Patentability for PCT/IB2009/000264.

* cited by examiner

*Primary Examiner* — Robert D. Harlan
(74) *Attorney, Agent, or Firm* — Stites & Harbison PLLC; Marvin Petry

(57) ABSTRACT

Aliphatic unsaturated polyester resins providing excellent weathering resistance. Use of a gelcoat providing excellent weathering resistance, UV resistance, reduction of yellowing and retention of gloss that is especially suitable as gelcoat for exterior glass fiber surfaces such as sailboats, motorboats, yachts and mobile homes. The gel comprises an aliphatic unsaturated polyester resin characterized in having a viscosity of 100-1000 mPa s (25° C.), a monomer content of 40±15% and an acid number of max 15 mg KOH/g.

7 Claims, 1 Drawing Sheet

Figure 1: Yellowing index based on differences between the averages of colour value b, as a function of time (hours) of UV exposure.

Figure 2: Gloss index based on differences between the averages of gloss values as a function of time (hours) of UV exposure.

ALIPHATIC UNSATURATED POLYESTER RESINS PROVIDING EXCELLENT WEATHERING RESISTANCE

BACKGROUND OF THE INVENTION

Glass fibre products, plastics and synthetic materials used outdoors need to be protected against the sun's damaging ultraviolet rays and temperature cycling in the presence of moisture that lead to yellowing and fading of surfaces. For instance is it desired that sailboats, motorboats, yachts and mobile homes keep looking their best in all weathers, withstanding the effects of sun, salt water and rough handling. To preserve the finish, gelcoats are usually applied to exterior surfaces and parts where weathering resistance is needed. Aside from having the right hardness, mechanical strength, flexibility and stability under fluctuating temperatures, the gelcoat must also provide some weathering resistance.

Gelcoat compositions that are to be exposed to UV light and rain for a long period of time are required to be superior in weatherability. Such exposure causes the binder resin of the gelcoat to be degraded so that the gelcoat becomes dull in gloss and discolored in a short term. In addition, the gelcoat undergoes chalking and is degraded or cracked with the passage of a long period of time.

Polyester gelcoats usually comprises a polyester on which the gelcoat is based and various additives. The use of unsaturated polyester resins as a base in gelcoats for outdoor glass fibre surfaces is known from e.g. U.S. Pat. No. 6,617,417 and U.S. Pat. No. 6,583,218. Suitable polyester resins for gelcoats include linear polyester resins, branched polyester resins, copolymeric polyester resins and mixtures or blends thereof. The utility of such compositions in outdoor applications is often limited by the resistance of the resin composition to weathering.

Unsaturated polyester resins are generally crosslinked with a compatible crosslinking monomer such as styrene, vinyl toluene, methyl methacrylate, methyl styrene, divinyl benzene, diallyl phthalate and the like. Usually the amount of crosslinking monomer is about 10 percent to about 55 percent by weight of the unsaturated polyester resin. Flexible unsaturated polyesters for coating applications have been traditionally processed from dicarboxylic acid and polypropylene oxides or polyethylene oxides. Part of the acid has to be unsaturated in order to have curing properties with normal peroxides or other radical initiators. Typical improvements relate to variations of monomers and by copolymers, e.g. blending unsaturated polyester with vinyl esters and epoxy resins.

Examples from prior art uses of unsaturated polyester resins in gelcoats include U.S. Pat. No. 6,617,417 which concerns an unsaturated polyester resin composition comprising divinyl ethers which are curable at room temperature. This composition comprises less than 30 wt. % of styrene, and do not provide improved yellowing resistance. U.S. Pat. No. 5,741,448 concerns a shrink resistant resin composition, which is curable at room temperature. The composition comprises a curable unsaturated polyester resin, an accelerator, a low temperature free radical peroxide initiator and a low profile additive comprising polyolefin powder. The composition is not suitable as a weathering resistant gelcoat. U.S. Pat. No. 6,583,218 concerns an unsaturated polyester resin composition with a reduced monomer content. The gelcoat is suitable for marine coating applications. Reduced styrene content reduces the release of volatile unsaturated organic monomers to the atmosphere but does not provide resistance to yellowing.

Gelcoats with good weatherability and resistance to yellowing are also known from prior art. U.S. Pat. No. 7,078,476 discloses a coating comprising a copolyester resin having superior gloss retention, weatherability and colour stability after long term outdoors exposure. The copolyester is not unsaturated, does not comprise styrene, and has an acid value of 0-3 mg KOH/g and is mainly suited as binder for an outdoor-durable top-coating paint. U.S. Pat. No. 5,464,909 concerns the use of an aliphatic polyester providing good UV resistance and weatherability. The polyester resin is based on dimethyl 2,6-decalindicarboxylate and neopentyl glycol and is used in powder coatings suitable for adhesion to metal substrates. EP 0 372 264 concerns one-component urethane compositions with improved weathering properties. The coating compositions comprise at least twenty percent by weight of resin solids of a compound comprising at least one oxazolidine ring chemically combined from the nitrogen atom of the ring through an alkylene-urethane linking group to a tetramethylxylylenediisocyanate prepolymer radical. EP 1 203 783 concerns the use of unsaturated polyester resins in products showing improved fire retardancy. Good weathering performance is obtained due to the use of unsaturated polyesters rather than phenolics. The products are not suited for gelcoats on glass fibre. EP 0 787 769 concerns modified polycarbonate/polyester compositions with high weather resistance. The compound comprises an aromatic polycarbonate resin, and a polyolefin rubber graft copolymer and a core-shell copolymer.

For gelcoats comprising an unsaturated polyester resin, it is common to use additives such as UV-stabilisers, thixotropic agents, thixotropy enhancers, suppressants, surface tension agents, co-promoters, air release agents, filler, wetting agents, levelling agents and pigments. Some of these additives are added to provide UV resistance and colour stability and hence increase the weatherability of the final coat. Traditionally, UV stabilisers are added to the gelcoat to provide the desired resistance to yellowing. However, the effect of added agents providing increased weatherability is limited.

Therefore, it is desirable to base the gelcoat on a polyester that in itself possesses good weatherability. The present invention presents the use of a polyester gelcoat specially formulated for improved resistance to UV and yellowing and retention of gloss.

SUMMARY OF THE INVENTION

This invention relates to aliphatic polyester resins and more particularly aliphatic unsaturated polyester resins providing excellent weathering resistance. The aliphatic unsaturated polyester resin is especially suitable for gelcoats that are to be applied to exterior glass fibre surfaces, plastics and synthetic materials such as materials used for sailboats, motorboats and yachts. The composition of the present invention exhibits high impact resistance and provides a surprising improvement in weatherability, particularly with regard to colour stability and retention of gloss.

The composition of the present invention has a surprisingly good effect on weatherability resulting from the choice of the unsaturated polyester resin used in the gelcoat composition independently from the effect on weatherability of the additives. Thus it has been found that the use of a certain group of unsaturated aliphatic polyester resins provides surprisingly enhanced resistance to yellowing much beyond compare of the use of additives. The invention therefore concerns the choice of polyester, and optionally in combination with additives, used in gelcoat formulations according to the claims.

DETAILED DESCRIPTION OF THE INVENTION

Figure 1:
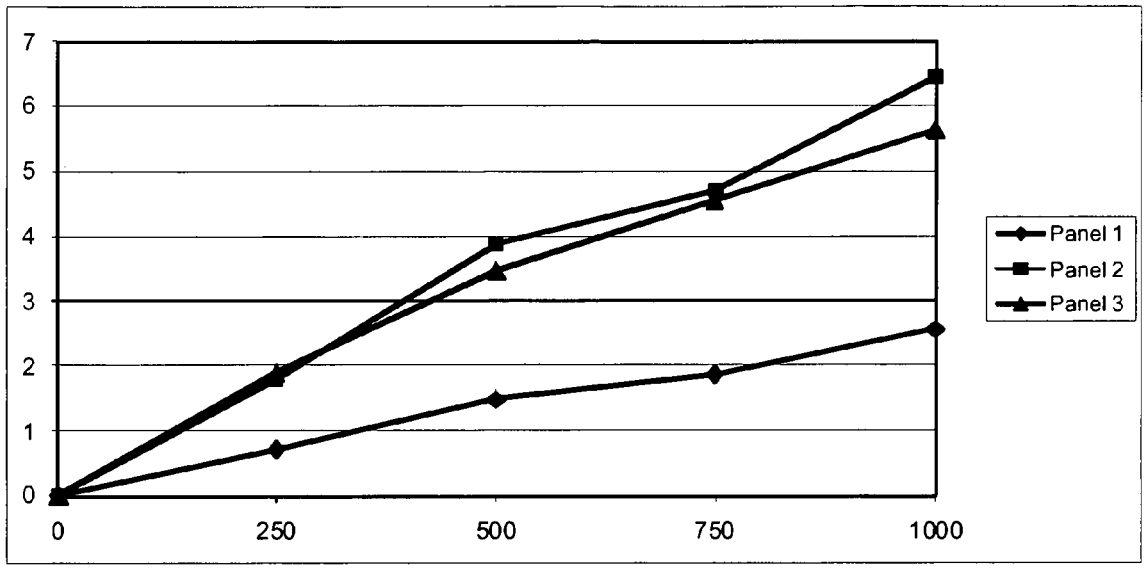
FIG. 1 is a graph showing the yellowing index based on differences between the averages of color value as a function of time of UV exposure.

The gelcoat comprises an aliphatic unsaturated polyester resin characterised in having a viscosity of 100-1000 mPa s (25° C.), a styrene monomer content of 40±15% and an acid number of max 15 mg KOH/g. UV stabilisers may additionally be added to further increase long term UV stability. The compounded resin compositions according to the invention may be formulated together with suitable additives known in the art to form gelcoats. The gelcoat may comprise one or more of additives selected from a group consisting of accelerators, inhibitors, UV-stabilisers, pigments, fillers, thixotropy agents, thixotropy enhancers, suppressants, air release agents, surface tension agents, wetting agents, levelling agents and styrene. As accelerators for initiating hardening, cobolt-octoate accelerators are preferred. Additionally, an amine accelerator such as dimethylaniline and/or diethylaniline may optionally be added to decrease the hardening time further. As inhibitors for extending geltime and potlife, a p-tert-butyl-catechol may be used. The UV-stabilisers may comprise one or more stabilisers which absorb free radicals (UV-stabiliser A) and block UV-radiation (UV-stabiliser B), respectively. The liquid base resin may be used as such, reinforced with glass or with other reinforcing materials known in the art, filled or unfilled, with or without thickeners and optionally blended with other types of resins, such as epoxy resins, urethane resins, vinyl esters, or blended with conventional unsaturated polyester resins in order to achieve desired properties in the cured products, such as suitable hardness and subzero flexibility or to increase the UV-resistance and weather-resistance further. The unsaturated polyester resins in accordance with the invention can also be used as such or with reinforcing agents such as glass fibre, as laminating agents and as a base resin for manufacturing of gelcoats for various applications.

The gelcoat may additionally be hardened by adding 1-3% hardener. A hardener suitable for curing unsaturated polyester resins at room temperature and elevated temperatures is a methyl-ethyl-keton-peroxide (MEKP), however, other hardeners known in the art may be used. Advisedly, 1-3% MEKP (50%) may be added.

A gelcoat according to the present invention may comprise 50-80% aliphatic unsaturated polyester resin such as 55%, or such as 60%, or such as 65%, or such as 70%, or such as 75%. The aliphatic unsaturated polyester resin is characterised in having a viscosity of 100-1000 mPa s (25° C.), such as 200 mPa s (25° C.), or such as 400 mPa s (25° C.), or such as 600 mPa s (25° C.), or such as 800 mPa s (25° C.). The aliphatic unsaturated polyester resin is furthermore characterised in having a styrene monomer content of 40±15% such as 30%, or such as 35%, or such as 40%, or such as 45%, or such as 50%. The aliphatic unsaturated polyester resin is furthermore characterised in having an acid number of max 15 mg KOH/g.

The gelcoat may furthermore comprise 0-0.5% coboltoctoate accelerator such as 0.1%, or such as 0.2%, or such as 0.3%, or such as 0.4%. The gelcoat may furthermore comprise 0-0.5% amine accelerator such as 0.1%, or such as 0.2%, or such as 0.3%, or such as 0.4%. The gelcoat may furthermore comprise 0-0.5% inhibitor such as 0.1%, or such as 0.2%, or such as 0.3%, or such as 0.4%. The gelcoat may furthermore comprise 0-0.5% air release agent such as 0.1%, or such as 0.2%, or such as 0.3%, or such as 0.4%. The gelcoat may furthermore comprise 0-0.5% levelling agent such as 0.1%, or such as 0.2%, or such as 0.3%, or such as 0.4%. The gelcoat may furthermore comprise 5-15% filler such as 7%, or such as 9%, or such as 11%, or such as 13%. The gelcoat may furthermore comprise 1-3% silica such as 1.5%, or such as 2%, or such as 2.5%. The gelcoat may furthermore comprise 0.2-0.5% glycol such as 0.25%, or such as 0.3%, or such as 0.35%, or such as 0.4% or such as 0.45%. The gelcoat may furthermore comprise 2-15% pigment such as 4%, or such as 6%, or such as 8%, or such as 10%, or such as 12%, or such as 14%. The gelcoat may furthermore comprise 0-2% absorbing UV-stabiliser (UV-stabiliser A) such as 0.25% or such as 0.5%, or such as 0.75%, or such as 1%, or such as 1.25%, or such as 1.50%, or such as 1.75%. The gelcoat may furthermore comprise 0-2 blocking UV-stabiliser (UV-stabiliser B) such as 0.25% or such as 0.5%, or such as 0.75%, or such as 1%, or such as 1.25%, or such as 1.5%, or such as 1.75%. The gelcoat may furthermore comprise 5-15% styrene such as 6%, or such as 8%, or such as 10%, or such as 12%, or such as 14%.

Example 1

Characteristics of an Aliphatic Unsaturated Polyester Resin According to the Invention Mechanical Properties Cured Resin

| Property | Value | Unit | Method |
| --- | --- | --- | --- |
| Barcol hardness | 50 | | EN60 |
| Flexural strength | 125 | mPa | EN63 |
| E-Module flexion | 3200 | mPa | EN63 |
| Tensile strength | 70 | mPa | EN61 |
| E-Module tension | 3000 | mPa | EN61 |
| Elongation at break | 4.0 | % | EN61 |
| HDT | 100 | ° C. | EN ISO 75A |

Mechanical Properties Reinforced Resin (Glass/Resin 30/70)

| Property | Value | Unit | Method |
| --- | --- | --- | --- |
| Flexural strength | 180 | mPa | EN63 |
| E-Module flexion | 7300 | mPa | EN63 |
| Tensile strength | 90 | mPa | EN61 |
| E-Module tension | 7100 | mPa | EN61 |

Typical Properties

| Property | Value | Unit |
| --- | --- | --- |
| Stability at 65° C. | 6 | days |
| Apha colour | 120 max | |
| SPI | 6 | minutes |
| peak temperature | 210 | ° C. |
| time to peak | 9 | minutes |
| Gel time at 25° C.* | 12 | minutes |

*Formulation 100 g resin + 0.2 ml Co(Oct)6% + 1.5 ml MEKP 50%

Example 2

Comparison Between Gelcoat with the Properties Defined in Example 1 and Two Competitive Gelcoats Three white glass fiber panels were coated with:
Panel 1: gelcoat with the properties defined in example 1
Panel 2: commercially available competitive gelcoat for boats
Panel 3: commercially available competitive gelcoat for boats different from the one used for panel 2.

The three panels were tested for UV exposure for a total of 1000 hours according to ASTM 154-04 method 01.

Evaluation of the following parameters was carried out after 0, 250, 500, 791 and 1000 hours of exposure
- Change in colour
- Change of gloss The average values for the parameters colour and gloss, respectively, are shown in schematic form in Table 1 for all three panels. Table 2, 3 and 4 show the individual measurements for each panel, respectively.

TABLE 1

Average values of yellowness (colour value b) and gloss, respectively, at exposure times 0 hours, 250 hours, 500 hours, 750 hours and 1000 hours, respectively.

| Panel | Exposure time (hours) | Colour value b (yellowing) | Gloss value |
|---|---|---|---|
| 1 | 0 | 5.69 | 138.47 |
|   | 250 | 6.40 | 82.37 |
|   | 500 | 7.17 | 87.83 |
|   | 791 | 7.55 | 83.33 |
|   | 1000 | 8.25 | 79.27 |
| 2 | 0 | 4.83 | 133.73 |
|   | 250 | 6.62 | 84.00 |
|   | 500 | 8.72 | 83.60 |
|   | 791 | 9.52 | 79.97 |
|   | 1000 | 11.28 | 59.37 |
| 3 | 0 | 2.28 | 139.27 |
|   | 250 | 4.17 | 86.87 |
|   | 500 | 5.76 | 86.20 |
|   | 791 | 6.84 | 61.20 |
|   | 1000 | 7.92 | 66.27 |

TABLE 2

Evaluation parameters of panel 1.

| Panel | Exposure time (Hours) | L | a | b | b avr. | ΔE | Avr. (ΔE) | 60° | 20° | 20° Avr. |
|---|---|---|---|---|---|---|---|---|---|---|
| 1 | 0 | 94.86 | −0.69 | 5.61 |  | 95.03 |  | 98.3 | 138.7 |  |
|  |  | 94.83 | −0.62 | 5.61 |  | 95.00 |  | 97.7 | 139.5 |  |
|  |  | 94.85 | −0.63 | 5.85 | 5.69 | 95.03 | 95.02 | 96.9 | 137.2 | 138.47 |
|  | 250 | 94.43 | −0.59 | 6.64 |  | 94.67 |  | 91.2 | 83 |  |
|  |  | 94.4 | −0.55 | 6.6 |  | 94.63 |  | 91.2 | 81.9 |  |
|  |  | 94.71 | −0.55 | 5.97 | 6.40 | 94.90 | 94.73 | 91.2 | 82.2 | 82.37 |
|  | 500 | 94.4 | −0.66 | 7.15 |  | 94.67 |  | 90.6 | 80.6 |  |
|  |  | 94.4 | −0.65 | 7.15 |  | 94.67 |  | 82.6 | 91.5 |  |
|  |  | 94.39 | −0.68 | 7.21 | 7.17 | 94.67 | 94.67 | 82.9 | 91.4 | 87.83 |
|  | 791 | 93.95 | −0.69 | 7.6 |  | 94.26 |  | 89.4 | 83 |  |
|  |  | 94.01 | −0.69 | 7.55 |  | 94.32 |  | 91.3 | 81.6 |  |
|  |  | 93.97 | −0.69 | 7.5 | 7.55 | 94.27 | 94.28 | 90.7 | 82.4 | 82.33 |
|  | 1000 | 93.97 | −0.79 | 8.31 |  | 94.34 |  | 89.8 | 77.9 |  |
|  |  | 94 | −0.73 | 8.21 |  | 94.36 |  |  | 79.9 |  |
|  |  | 94.06 | −0.74 | 8.23 | 8.25 | 94.42 | 94.37 |  | 80 | 79.27 |

TABLE 3

Evaluation parameters of panel 2.

| Panel | Exposure time (Hours) | L | a | b | b avr. | ΔE | Avr. (ΔE) | 60° | 20° | 20° Avr. |
|---|---|---|---|---|---|---|---|---|---|---|
| 2 | 0 | 94.77 | −0.76 | 4.98 |  | 94.90 |  | 97.4 | 132.4 |  |
|  |  | 94.89 | −0.73 | 4.65 |  | 95.01 |  | 97.3 | 135.7 |  |
|  |  | 94.77 | −0.74 | 4.86 | 4.83 | 94.90 | 94.94 | 86 | 133.1 | 133.73 |
|  | 250 | 94.65 | −0.33 | 6.97 |  | 94.91 |  | 90.7 | 84 |  |
|  |  | 94.57 | −0.38 | 7.07 |  | 94.83 |  | 90.7 | 84 |  |
|  |  | 94.89 | −0.26 | 5.82 | 6.62 | 95.07 | 94.94 | 90.7 | 84 | 84.00 |
|  | 500 | 94.48 | −0.57 | 8.93 |  | 94.90 |  | 92.4 | 83.5 |  |
|  |  | 94.46 | −0.56 | 9.01 |  | 94.89 |  | 92.4 | 83.6 |  |
|  |  | 94.63 | −0.52 | 8.21 | 8.72 | 94.99 | 94.93 | 92.4 | 83.7 | 83.60 |
|  | 791 | 93.94 | −0.53 | 9.53 |  | 94.42 |  | 88.1 | 79.4 |  |
|  |  | 93.96 | −0.55 | 9.72 |  | 94.46 |  | 89.1 | 80.2 |  |
|  |  | 94.08 | −0.53 | 9.3 | 9.52 | 94.54 | 94.48 | 90 | 80.3 | 79.97 |
|  | 1000 | 93.99 | −0.6 | 10.76 |  | 94.61 |  | 84.3 | 58.9 |  |
|  |  | 93.81 | −0.62 | 11.47 |  | 94.51 |  |  | 58.8 |  |
|  |  | 93.79 | −0.64 | 11.61 | 11.28 | 94.51 | 94.54 |  | 60.4 | 59.37 |

TABLE 4

Evaluation parameters of panel 3.

| Panel | Exposure time (Hours) | Colour L | a | b | b avr. | ΔE | Avr. (ΔE) | Gloss 60° | 20° | 20° Avr. |
|---|---|---|---|---|---|---|---|---|---|---|
| 3 | 0 | 95.66 | −0.93 | 2.28 |  | 95.69 |  | 93.6 | 138.7 |  |
|  |  | 95.69 | −0.93 | 2.29 |  | 95.72 |  | 94.3 | 138.1 |  |
|  |  | 95.66 | −0.92 | 2.26 | 2.28 | 95.69 | 95.70 | 96.2 | 141 | 139.27 |
|  | 250 | 95.27 | −0.71 | 4.47 |  | 95.38 |  | 81.8 | 86.7 |  |
|  |  | 95.45 | −0.7 | 3.53 |  | 95.52 |  | 82.4 | 87 |  |
|  |  | 95.24 | −0.69 | 4.5 | 4.17 | 95.35 | 95.41 | 82.6 | 86.9 | 86.87 |
|  | 500 | 95.01 | −0.74 | 5.86 |  | 95.19 |  | 79.9 | 86.2 |  |
|  |  | 95.05 | −0.71 | 5.82 |  | 95.23 |  | 79.5 | 86.2 |  |
|  |  | 95.03 | −0.73 | 5.6 | 5.76 | 95.20 | 95.21 | 79.4 | 86.2 | 86.20 |
|  | 791 | 94.43 | −0.74 | 6.75 |  | 94.67 |  | 79.9 | 65.1 |  |
|  |  | 94.48 | −0.75 | 6.99 |  | 94.74 |  | 83.7 | 58.7 |  |
|  |  | 94.53 | −0.79 | 6.77 | 6.84 | 94.78 | 94.73 | 83.8 | 59.8 | 61.20 |
|  | 1000 | 94.31 | −0.76 | 7.88 |  | 94.64 |  |  | 64.8 |  |
|  |  | 94.29 | −0.77 | 7.97 |  | 94.63 |  |  | 66.9 |  |
|  |  | 94.43 | −0.76 | 7.9 | 7.92 | 94.76 | 94.68 |  | 67.1 | 66.27 |

As can bee seen from FIG. 1 showing the yellowing index based on the differences between the averages of colour value b, at different times after exposure to UV, panel 1 is superior in UV resistance as this gelcoat has only developed yellowing to half the extend of the competitive gelcoats after 1000 hours of exposure.

Figure 2:
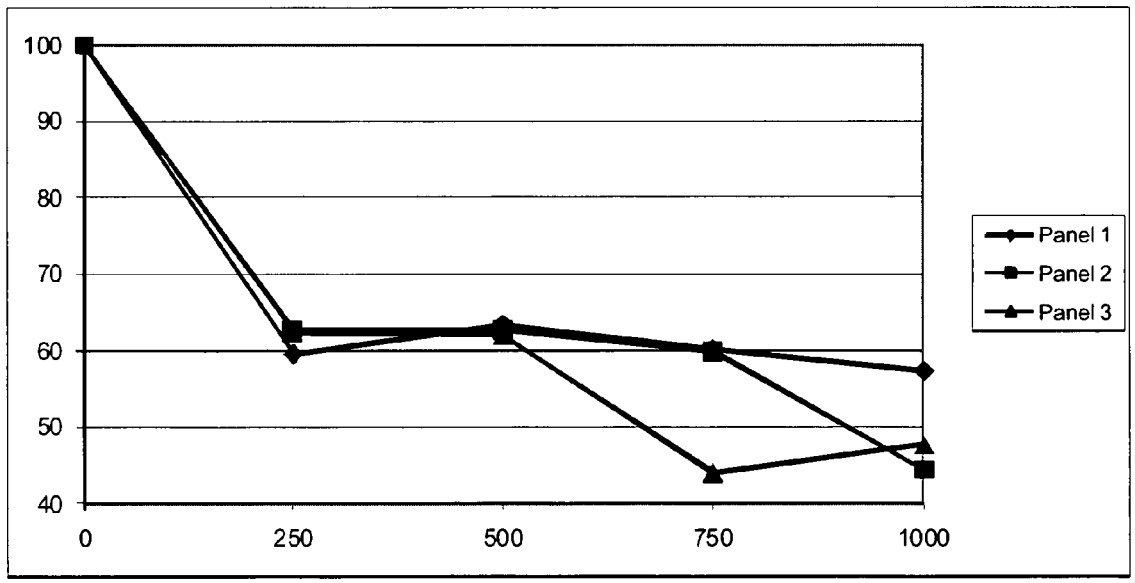
FIG. 2 is a graph showing the gloss index based on differences between the averages of gloss values as a function of time of UV exposure.

As illustrated in FIG. 2, showing the gloss index based on the differences between the averages of the gloss values, at different times after exposure to UV, there is a dramatic change in gloss (half the gloss value) after an exposure time of 250 hours for all three panels and thereafter a levelling of the gloss value as a function of exposure time. However, Panel 1 shows the highest gloss value after 1000 hours of exposure.

Example 3

Colour Stabilisation Tests

A sample of the gelcoat of example 1 (sample 1), and samples of this gelcoat with different additives as listed in table 5 were compared to gelcoat samples of two commercially available competitor gelcoats (competitor 1 and competitor 2) in an ASTM G 53-93 test method using an UVCON-A. Colour measurements were performed at 45° C. after 250 hours, 500 hours, 750 hours, 1000 hours and 1250 hours, respectively.

TABLE 5

Colour stabilisation measurements at different times (hours) after exposure to UV of a gelcoat according to example 1 (sample 1) and of gelcoats according to example 1 further comprising different additives and of competitor gelcoats.

| Stabilization | 250 h ΔL | Δa | Δb | ΔE | 500 h ΔL | Δa | Δb | ΔE | 750 h ΔL | Δa | Δb | ΔE | 1000 h ΔL | Δa | Δb | ΔE | 1250 h ΔL | Δa | Δb | ΔE |
|---|---|---|---|---|---|---|---|---|---|---|---|---|---|---|---|---|---|---|---|---|
| Sample 1 | 0.0 | 0.0 | 1.3 | 1.3 | 0.4 | −0.1 | 1.9 | 2.0 | −0.1 | −0.2 | 2.7 | 2.7 | −0.4 | −0.3 | 3.2 | 3.3 | −0.4 | −0.4 | 3.8 | 3.9 |
| 2.0% TB-02 liq | −0.1 | −0.1 | 1.3 | 1.3 | 0.3 | 0.0 | 1.5 | 1.5 | −0.1 | −0.1 | 1.8 | 1.8 | −0.9 | −0.3 | 2.3 | 2.5 | −0.9 | −0.2 | 2.4 | 2.6 |
| 1.0% 3058 liq | 0.1 | 0.1 | 0.9 | 0.9 | 0.2 | 0.0 | 1.2 | 1.2 | −0.1 | 0.0 | 1.6 | 1.6 | −0.3 | −0.1 | 1.9 | 2.0 | −0.3 | −0.1 | 2.4 | 2.4 |
| 2.0% 3058 liq | −0.4 | 0.1 | 0.9 | 1.0 | 0.3 | 0.1 | 1.2 | 1.2 | −1.0 | 0.0 | 1.4 | 1.8 | −0.9 | −0.1 | 1.9 | 2.1 | −0.9 | −0.1 | 2.2 | 2.4 |
| 1.0% 3330 liq | −0.3 | −0.1 | 1.6 | 1.6 | −0.2 | −0.3 | 2.4 | 2.4 | −0.7 | −0.4 | 3.4 | 3.5 | −1.0 | −0.6 | 4.4 | 4.5 | −0.8 | −0.6 | 5.1 | 5.2 |
| 2.0% 3330 liq | −0.7 | −0.2 | 1.7 | 1.8 | −0.3 | −0.3 | 2.5 | 2.5 | −1.5 | −0.4 | 3.0 | 3.4 | −1.4 | −0.6 | 3.9 | 4.2 | −0.7 | −0.6 | 4.6 | 4.7 |
| 1.0% TB-02 liq + 1.0% 3058 | −0.3 | 0.0 | 1.1 | 1.2 | −0.5 | 0.0 | 1.5 | 1.6 | −0.7 | −0.1 | 2.2 | 2.3 | −0.9 | −0.2 | 2.4 | 2.5 | −1.1 | −0.3 | 3.4 | 3.5 |
| 1.0% VSU pwd | −1.0 | −0.1 | 1.7 | 2.0 | −0.5 | −0.2 | 2.6 | 2.6 | −0.6 | −0.3 | 3.9 | 3.9 | −1.0 | −0.5 | 4.2 | 4.3 | −1.0 | −0.5 | 4.9 | 5.0 |
| Competitor 1 | 0.3 | 0.4 | 2.7 | 2.7 | 0.1 | 0.3 | 4.1 | 4.1 | −0.6 | 0.1 | 5.3 | 5.3 | −0.7 | 0.0 | 6.4 | 6.5 | −0.7 | −0.1 | 8.4 | 8.4 |
| Competitor 2 | −1.5 | 0.3 | 2.3 | 2.7 | −0.2 | 0.2 | 3.3 | 3.3 | −0.7 | 0.1 | 4.4 | 4.5 | −1.0 | 0.0 | 5.5 | 5.6 | −0.9 | 0.0 | 6.3 | 6.3 |

It appears from table 5 that the "sample 1" gelcoat is superior in resistance to yellowing after 1250 hours compared to the competitor gelcoats. The resistance to yellowing is furthermore increased by addition of "3058".

Example 4

Colour Stabilisation Test

A sample of the gelcoat of example 1 (sample 1), and samples of this gelcoat with different additives as listed in table 6 were compared to gelcoat samples of two commercially available competitor gelcoats in a SAE J 1960 test method using a W-O-M. Colour measurements were performed at 45° C. after 250 hours, 500 hours, 750 hours, 1000 hours and 1250 hours, 1500 hours and 1750 hours, respectively.

It appears from table 6 that the gelcoat in sample 1 is superior in resistance to yellowing after 1750 hours compared to the competitor gelcoats. The resistance to yellowing is furthermore increased by addition of all of the tested additives, except 2% "3330".

Table 6: Colour stabilisation measurements at different times (hours) after exposure to UV of a gelcoat according to example 1 (sample 1) and of gelcoats according to example 1 further comprising different additives and of competitor gelcoats.

TABLE 6

| Stabilization | 250 h | | | | 500 h | | | | 750 h | | | | 1000 h | |
|---|---|---|---|---|---|---|---|---|---|---|---|---|---|---|
| | ΔL | Δa | Δb | ΔE | ΔL | Δa | Δb | ΔE | ΔL | Δa | Δb | ΔE | ΔL | Δa |
| Sample 1 | −3.5 | −0.1 | 0.2 | 3.5 | −0.2 | −0.1 | 0.8 | 0.8 | −0.7 | −0.3 | 1.3 | 1.5 | −0.5 | −0.4 |
| 1.0% 3330 liq | −3.6 | −0.1 | 0.2 | 3.6 | −0.3 | −0.1 | 0.5 | 0.5 | −0.7 | −0.2 | 0.7 | 1.0 | −0.7 | −0.2 |
| 2.0% 3330 liq | −3.7 | −0.1 | 0.1 | 3.7 | −0.4 | −0.1 | 0.4 | 0.6 | −0.8 | −0.2 | 0.8 | 1.1 | −0.7 | −0.2 |
| 1.0% 3058 liq | −3.5 | −0.1 | 0.0 | 3.5 | −0.2 | 0.0 | 0.3 | 0.4 | −0.6 | −0.1 | 0.5 | 0.8 | −0.5 | −0.1 |
| 2.0% 3058 liq | −3.7 | −0.1 | 0.3 | 3.7 | −0.5 | −0.2 | 0.8 | 1.0 | −0.8 | −0.3 | 1.1 | 1.4 | −0.7 | −0.4 |
| 2.0% TB-02 liq | −3.7 | −0.2 | 0.4 | 3.8 | −0.5 | −0.3 | 1.1 | 1.2 | −0.2 | −0.4 | 1.6 | 1.6 | −0.9 | −0.5 |
| 1.0% TB-02 liq + 1.0% 3058 | −3.8 | −0.1 | 0.1 | 3.8 | −0.6 | −0.1 | 0.5 | 0.8 | −0.3 | −0.3 | 1.1 | 1.1 | −1.0 | −0.4 |
| 1.0% VSU pwd | −3.7 | −0.1 | 0.4 | 3.7 | −0.5 | −0.2 | 1.0 | 1.1 | −0.9 | −0.3 | 1.4 | 1.7 | −0.8 | −0.4 |
| Competitor 1 | −3.3 | 0.5 | 0.6 | 3.4 | −0.1 | 0.4 | 1.4 | 1.4 | 0.3 | 0.3 | 2.1 | 2.2 | −0.4 | 0.2 |
| Competitor 2 | −3.5 | 0.4 | 0.7 | 3.5 | −0.3 | 0.5 | 1.3 | 1.4 | −0.1 | 0.4 | 1.9 | 1.9 | −0.7 | 0.3 |

| Stabilization | 1000 h | | 1250 h | | | | 1500 h | | | | 1750 h | | | |
|---|---|---|---|---|---|---|---|---|---|---|---|---|---|---|
| | Δb | ΔE | ΔL | Δa | Δb | ΔE | ΔL | Δa | Δb | ΔE | ΔL | Δa | Δb | ΔE |
| Sample 1 | 1.8 | 1.9 | −0.5 | −0.4 | 1.8 | 1.9 | 0.2 | −0.4 | 1.6 | 1.7 | 1.0 | −0.2 | 1.6 | 1.9 |
| 1.0% 3330 liq | 1.1 | 1.3 | −0.5 | −0.3 | 1.1 | 1.3 | 0.0 | −0.4 | 1.3 | 1.3 | 0.5 | −0.2 | 1.2 | 1.3 |
| 2.0% 3330 liq | 1.2 | 1.4 | −0.8 | −0.2 | 1.3 | 1.5 | −0.3 | −0.3 | 1.3 | 1.4 | 0.5 | −0.2 | 1.3 | 1.4 |
| 1.0% 3058 liq | 0.8 | 1.0 | −0.5 | −0.2 | 0.9 | 1.0 | 0.0 | −0.3 | 1.0 | 1.0 | 0.1 | −0.1 | 1.0 | 1.0 |
| 2.0% 3058 liq | 1.6 | 1.8 | −0.7 | −0.4 | 1.7 | 1.9 | 0.0 | −0.4 | 1.5 | 1.6 | 0.7 | −0.3 | 1.6 | 1.7 |
| 2.0% TB-02 liq | 2.1 | 2.3 | −0.8 | −0.5 | 2.1 | 2.3 | 0.0 | −0.5 | 1.9 | 2.0 | 1.1 | 0.2 | 2.7 | 2.9 |
| 1.0% TB-02 liq + 1.0% 3058 | 1.5 | 1.8 | −1.0 | −0.4 | 1.7 | 2.0 | −0.4 | −0.4 | 1.7 | 1.7 | 0.4 | −0.2 | 1.5 | 1.6 |
| 1.0% VSU pwd | 1.8 | 2.0 | −0.9 | −0.4 | 2.0 | 2.2 | −0.1 | −0.4 | 1.7 | 1.7 | 0.8 | −0.2 | 1.6 | 1.8 |
| Competitor 1 | 2.8 | 2.8 | −0.4 | 0.2 | 3.3 | 3.3 | 0.3 | 0.0 | 3.4 | 3.4 | 1.1 | 0.2 | 1.8 | 2.1 |
| Competitor 2 | 2.3 | 2.5 | −0.5 | 0.4 | 2.3 | 2.4 | 0.5 | 0.3 | 2.4 | 2.5 | 0.4 | 0.3 | 4.2 | 4.2 |

Example 5

Formulation for Gelcoat Based on an Aliphatic Unsaturated Polyester Resin

| | |
|---|---|
| Aliphatic unsatured polyester resin | 50-80% |
| Cobolt-octoate accelerator | 0-0.5% |
| Amine accelerator | 0-0.5% |
| Inhibitor | 0-0.5% |
| Air release agent | 0-0.5% |
| Levelling agent | 0-0.5% |
| Filler | 5-15% |
| Silica | 1-3% |
| Glycol | 0.2-0.5% |
| Pigment | 2-15% |
| UV additive A | 0-2% |
| UV additive B | 0-2% |
| Styrene | 5-15% | wherein the aliphatic unsaturated polyester resin is characterised in:
a viscosity of 500-600 mPa s (25° C.)
a styrene monomer content of 40±2% and
an acid number of max 15 mg KOH/g

The invention claimed is:

1. A gelcoat comprising:

| | |
|---|---|
| Aliphatic unsaturated polyester resin | 50-80% |
| Cobolt-octoate accelerator | 0-0.5% |
| Amine accelerator | 0-0.5% |
| Inhibitor | 0-0.5% |
| Air Release Agent | 0-0.5% |
| Levelling Agent | 0-0.5% |
| Filler | 5-15% |
| Silica | 1-3% |
| Glycol | 0.2-0.5% |
| Pigment | 2-15% |
| UV-stabiliser A | 0-2% |
| UV-stabiliser B | 0-2% |
| Styrene | 5-15% | wherein the aliphatic unsaturated polyester resin has
a viscosity of 500-600 mPa s (25° C.)
a styrene monomer content of 40±2% and
an acid number of max 15 mg KOH/g.

2. A method for applying a gelcoat to a surface comprising:
formulating a gelcoat comprising an aliphatic unsaturated polyester resin; the resin having:
a viscosity of 500-600 mPa s (25° C.)
a styrene monomer content of 40±2% and
an acid number of max 15 mg KOH/g applying said gelcoat on an exterior surface of a material selected from the group consisting of glass fibre, plastics and other synthetic materials such as materials.

3. The method of claim 2 wherein the synthetic materials include materials used in sailboats, yachts, motorboats and mobile homes.

4. The method according to claim 2 wherein said gelcoat further comprises other types of resins.

5. The method of claim 4 where in the other types of resins are selected from the group consisting of epoxy resins, urethane resins, vinyl esters, or conventional unsaturated polyester resins.

6. The method according to claim 2 wherein said gelcoat is reinforced with a reinforcing material.

7. The method according to claim 2 wherein said gelcoat comprises one or more additives selected from a group consisting of accelerators, inhibitors, hardeners, UV-stabilisers, pigments, fillers, thixotropy agents, thixotropy enhancers, suppressants, air release agents, surface tension agents, wetting agents, levelling agents and styrene.

* * * * *